March 24, 1953  C. A. GIAUQUE  2,632,624
VALVE CLOSURE MEMBER
Filed Dec. 26, 1947
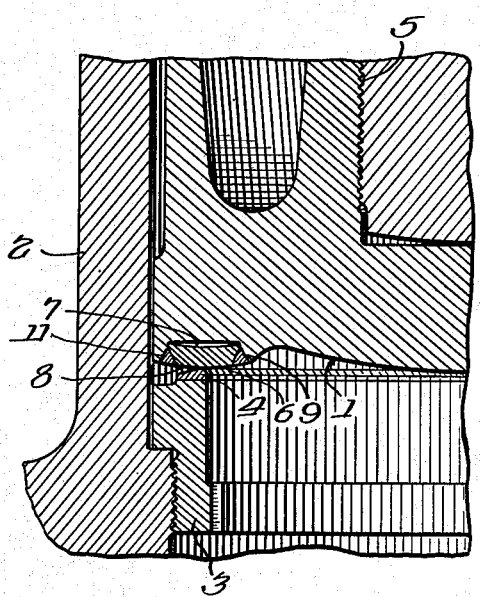
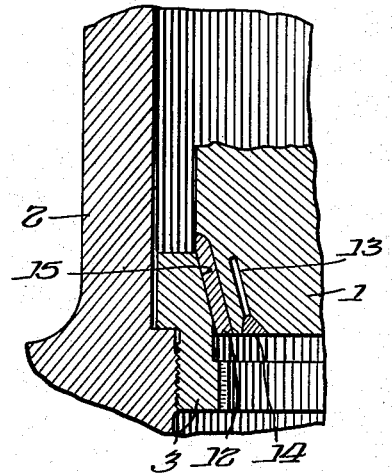
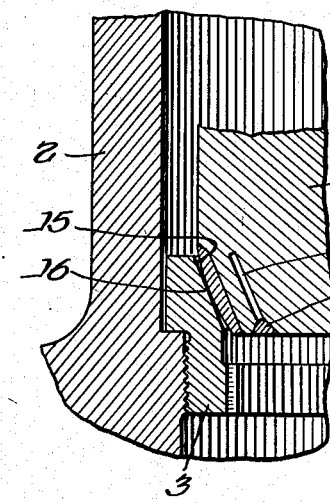
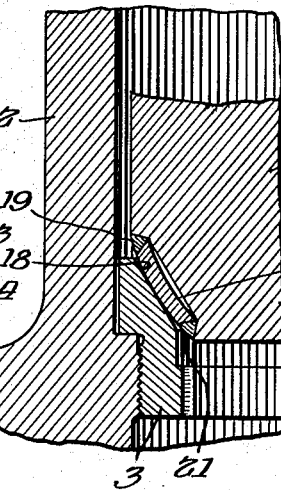
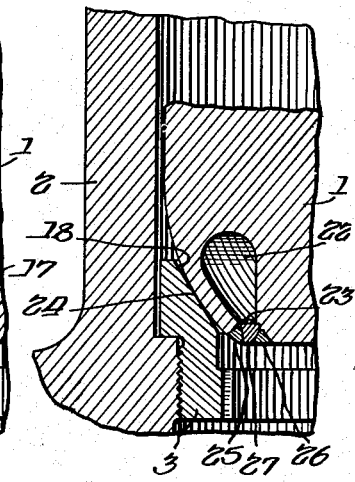
Inventor.
Charles A. Giauque.
By Joseph O. Lange, Atty.

Patented Mar. 24, 1953

2,632,624

UNITED STATES PATENT OFFICE 2,632,624

VALVE CLOSURE MEMBER

Charles A. Giauque, Berwyn, Ill., assignor to Crane Co., Chicago, Ill., a corporation of Illinois Application December 26, 1947, Serial No. 793,918

4 Claims. (Cl. 251—159)

This invention relates to valve closure members and more particularly to a flexible disc or closure member construction suitable for use with globe, angle or check valves and the like.

At the outset in order to obtain a true appreciation of the background of this invention it should be understood that heretofore in the design of flexible valve discs, the thinking has centered on the use of flat washers welded or otherwise suitably attached to the disc. An annular recess in the disc allowed for positioning and deflection of the inserts in the course of seating the valve, but these structures carried serious objections.

Analysis of the directional forces and stresses to which such constructions were subjected shows that normal valve seating placed the inserts and the attendant welds in tension thereby resulting in costly failures of the welds. The explanation of undue tension has been clearly verified by tests and an entirely new approach has been made in the instant invention in order to solve the problem.

Therefore one of the more important objects of this invention is to provide in a valve disc construction for the use of a suitably curved cross section in the insert employed and in which such disc insert is preferably welded into the disc or holder. When subjected to seating loads in the usual course of service the novel insert and the welds are placed in compression during the seating of the valve.

It has been found by actual tests and subsequent service in the field that the cause of such fracture of the welds has been eliminated and in seating the body rings in tension reduces the convexity of the seat inserts without detracting from desirable flexibility.

It is another important object to provide for a construction in which such proportions as the thickness of the insert may be easily determined to prevent collapse or deflection beyond the elastic limit of the material from which it is made.

Other objects and advantages will become more readily apparent upon proceeding with the specification read in light of the accompanying drawings in which Fig. 1 is a fragmentary sectional view showing a preferred embodiment of the invention.

Fig. 2 is a fragmentary sectional view of a modified form.

Figs. 3, 4 and 5 are fragmentary sectional views of modified forms.

Similar reference characters refer to similar parts throughout the several views. Referring now to Fig. 1, a closure member 1 is shown suitably mounted within a body 2 and guided therewithin as indicated. A seat ring 3 is employed having the seat portion 4. The closure member is reciprocally movable, being actuated either by pressure as in a check valve or else by a stem (not shown) attached to the threads 5, for effecting such reciprocating closure movement. The closure member is provided with an insert ring 6 for seating contact, the said insert being of annular bowed form as shown at 7 and 8 respectively. The inner and outer peripheral portions of the insert seat ring are enclosed by annular welds 9 and 11 for attachment to the member 1. Thus it will be apparent that when the closure member is moved to abut against the seat in effecting a tight valve the welds 9 and 11 being in wedge form in cross-section will be placed under compression. At the same time the insert ring 6 will be similarly compressed to thereby impart a resiliency which is desirable along the curved cross-section represented by numerals 7 and 8 while at the same time the welds 9 and 11 are not under tension, but instead are loaded solely in compression. Thus great strength and durability is provided in addition to a relatively flexible seat construction.

In Fig. 2 a fragmentary view is shown in which the closure member 1 provided optionally with a seat facing 12 the disc being annularly relieved to form the chamber 13, the lower portion of the annularly extending chamber being weld sealed as at 14, in which construction when the disc is seated against the casing ring 15 the seating load against the weld will place the latter under compression. It will thus become apparent that a plug type of closure member may be used conveniently to embody the same principle of construction as hereinabove described.

Fig. 3 is similar to the construction of Fig. 2 except that the seating contact surface at 15 constitutes a line bearing as indicated at 16. The relieved annular portions 13 and the weld 14 are similarly applied as described in connection with Fig. 2.

Fig. 4 is a further modified form in which a line bearing is preferably but not necessarily used, the bowed seat ring 17 bearing against the surface 18 during the normal course of seating the valve so as to create a line bearing contact at least initially. In this construction, it should be specially noted that the bowed annular seat insert is suitably weld sealed at both inner and outer peripheries as at 19 and 21 to form a fluid tight contact and likewise here also to place the peripheral welds under compression in the course of seating the valve. During the latter actuation the bowed seat insert will yield slightly in providing a resilient seat contact. The welds contribute to providing improved flexibility.

In Fig. 5 another form of weld is shown in which the seat closure member is provided with an annular relieved portion or chamber having a substantially larger space as at 22 and preferably tapering to the narrow annular opening at 23 thereby forming an outer peripheral arcuately curved wall 24 possessing a desirable degree of elasticity or resilience in seating the valve as hereinabove referred to in describing the other figures.

The annular chamber 22 is weld sealed by means of the welds 25 and 26 and the interposed member 27 annularly positioned between the lower end portion of the closure member 1 and the annularly extending lip 24. Thus in seating a valve of this construction the welds are placed under compression in addition to the seating portion 24 and the interposed member 27.

It is recognized that the particular forms of construction adopted may vary substantially from that illustrated and described. It is the desire therefore not to be limited to the precise construction, arrangement and operation of parts as hereinabove shown and described, since it is manifest that other variations or modifications in the detailed structure and arrangement may be employed, without departing from the spirit and scope of this invention. Reservation of the right is therefore made to all such variations and modifications as properly fall within the scope of my improvements and terms of the following claim.

I claim:

1. In a valve, the combination including a closure member for contacting a valve seat, the said closure including an inclined convex seat insert comprising an annular ring with a closed chamber adjacent to said insert and positioned on an opposite side thereof relative to the seat contact face whereby limited flexibility is imparted to the latter insert member during the course of seating the closure member, annular weld means on the said closure member for sealing inner and outer peripheral portions of the said seat insert, the said annular weld means being under compression for sealing the chamber peripherally and for holding said seat insert under predetermined compression when the said closure member is seated with the convex portion of the said insert bearing against said valve seat.

2. In a valve, a closure member having a seating face, said closure member having an annular recess formed transversely in the face thereof and being defined by inner and outer annular shoulder portions, a seat member formed of a depending means comprising a wall of the said recess and including a relatively thin metal annular ring covering said recess and having its inner and outer peripheries fixed to the shoulder portions in the seating face of the closure member, at least one of the closure member peripheries being weld sealed to form an annular recess back of the said seat member, the said seat member being yieldably resistant to seating pressure when the valve is being closed, said depending means on the said closure member forming a continuation of the wall of the said recess and interposed between a peripheral portion of the seat member and the outer periphery of the closure member to complete the closed annular recess and being spaced apart annularly from inner and outer shoulders forming the said recess, the said depending means and the sealing means being under compression when the closure member is seated.

3. In a valve, a valve seat, a closure member therefor, the latter including a relatively thin seat portion comprising an annular ring of slightly arcuate cross-section, weld sealing means cooperating with inner and outer peripheral limits of the said ring portion, the said ring portion providing a seating contact surface for the said closure member, the said sealing means connecting the said ring to the closure member, and enclosing the inner and outer limits of the said ring to hingedly permit flexing of the said seat ring predeterminately inwardly, whereby upon said flexing of the said seat ring portion outward radial compression of the said weld sealing means is effected relative to the said ring.

4. A closure member having a recess valve head and a resilient seat structure, the latter structure including an insert ring of curved cross-section, substantially concentric weld sealing means connecting the said ring to the closure member on the inner and outer peripheries of the said insert ring, the weld sealing means annularly abutting walls defining the recess of the said valve head whereby the concentric weld means is placed under compression when the said closure member is seated thereby to limit the flexibility of the said insert ring, the said insert ring being received within the recess on the valve head to form a chamber therewithin, the said weld means sealing the said chamber.

CHARLES A. GIAUQUE.

REFERENCES CITED

The following references are of record in the file of this patent:

UNITED STATES PATENTS

| Number | Name | Date |
| --- | --- | --- |
| 749,637 | Smith | June 12, 1904 |
| 2,435,882 | Fawkes | Feb. 10, 1948 |